United States Patent [19]
Griswold

[11] 3,752,184
[45] Aug. 14, 1973

[54] FLOW CONTROL VALVE

[75] Inventor: David E. Griswold, Corona Del Mar, Calif.

[73] Assignee: Griswold Controls, Santa Ana, Calif.

[22] Filed: Dec. 2, 1971

[21] Appl. No.: 204,027

[52] U.S. Cl. ............................. 137/504, 137/625.3
[51] Int. Cl. ............................................. F16k 31/12
[58] Field of Search ................. 137/503, 504, 517, 137/512.1, 625.3, 625.37, 625.38, 625.39

[56] References Cited
UNITED STATES PATENTS

| | | | |
|---|---|---|---|
| 3,131,716 | 5/1964 | Griswold et al. | 137/517 X |
| 3,256,905 | 6/1966 | Griswold et al. | 137/517 X |
| 2,918,087 | 12/1959 | Curran | 137/625.3 |
| 3,120,243 | 2/1964 | Allen et al. | 137/504 |
| 3,285,282 | 5/1966 | Martin | 137/504 X |
| 3,540,484 | 11/1970 | Brown et al. | 137/503 X |

FOREIGN PATENTS OR APPLICATIONS

| | | | |
|---|---|---|---|
| 399,217 | 7/1924 | Germany | 137/625.3 |

Primary Examiner—Henry T. Klinksiek
Attorney—Charles G. Lyon et al.

[57] ABSTRACT

A flow control valve employs a ported cup which slides within an opening in a stationary member under increasing pressure differential and against the action of a spring, so that pressure differential changes have little or no effect on the rate of flow through the valve. A cylindrical side wall of the cup is provided with a plurality of axially extending duplicate series of circumferentially staggered separate port segments, the port segments in each of the series decreasing in circumferential width toward a closed end of the cup. Adjacent port segments in the series have end boundaries in substantially the same transverse plane normal to the cup axis, and one side boundary of each port segment in the series lies in a plane containing the axis of the cup. The shape and pattern of the port segments provide greater cup strength and minimize trapping of foreign objects carried by the fluid.

18 Claims, 5 Drawing Figures

Patented Aug. 14, 1973

FLOW CONTROL VALVE

This invention relates to flow control valves of the general type shown in U. S. Pat. Nos. 3,131,716 granted May 5, 1964, and 3,256,905 granted June 21, 1966. The flow control valves shown in those patents each employs a ported cylindrical cup axially slidable through a circular opening in a stationary orifice plate. A pressure differential across the cup causes it to slide through the plate opening against the action of a spring. Such movement changes the total combined area of a series of continuous tapered ports exposed to upstream pressure, so that the flow rate remains substantially constant regardless of the pressure differential.

The long tapered symmetrical ports shown by these prior patents tend to weaken the structural strength of the movable cup so that the cup cylinder may require reforming after the ports are cut. If the cylindrical cups are to be precision finished as by a centerless grinder, the surface areas interrupted by the symmetrical continuous ports cause difficulty in the grinding operation. Furthermore, foreign objects carried by the fluid are apt to be trapped or wedged along tapered portions of the symmetrical ports.

It is the principal object of the present invention to avoid the above named difficulties by providing one or more series of circumferentially staggered separate port segments which regulate fluid flow in the same manner as the long continuous symmetrical segments shown in said prior patents. The staggered port segments provide interlaced metal sections which contain more of the cylindrical structure, provide greater strength and eliminate the need for reforming the cylindrical portion after the ports are cut. When the cylindrical cups are precision finished, the port segments produce an interlaced metal pattern that provides a more continuous circumferential surface condition, and consequently ground surfaces are more uniformly cylindrical. Moreover, the port segments tend to pass or cut off foreign matter rather than to cause it to be wedged or trapped within the tapering boundaries of the port.

Other and more detailed objects and advantages will appear hereinafter.

Figure 1:
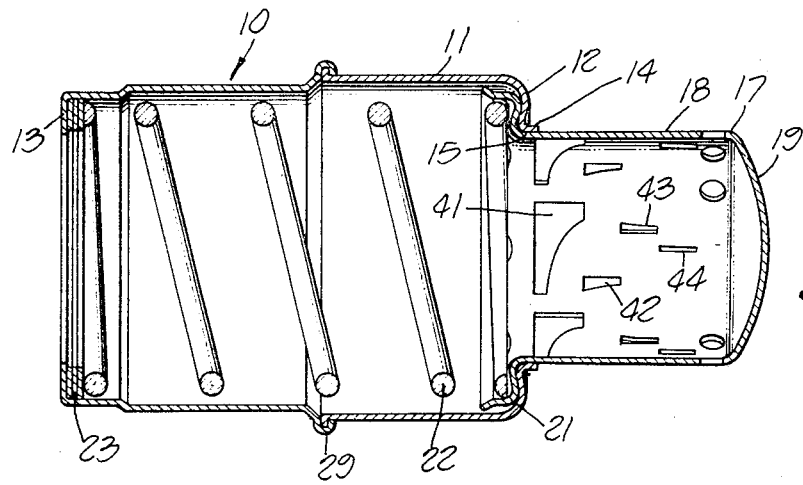
FIG. 1 is a longitudinal sectional elevation showing a preferred embodiment of this invention.

Referring to the drawings, the flow control valve generally designated 10 includes a two-part stationary cylindrical shell 11 having a front flange 12 and a rear flange 13. An axially extending lip 14 on the flange 12 has a central cylindrical opening 15. A cup element 17 is provided with a cylindrical side wall 18 and an integral domed end wall 19. The cylindrical wall 18 slides within the opening 15. The cup 17 is provided with an enlarged flange 21 which receives one end of the coil compression spring 22 mounted within the shell 11. The other end of the spring 22 engages one of the series of annular shims 23 held by the spring against the rear flange 13.

Figure 2:
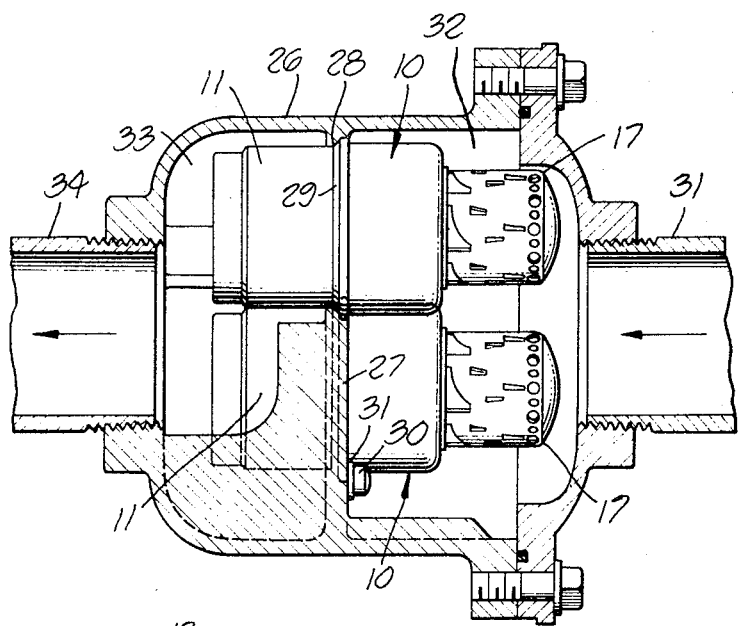
FIG. 2 is a sectional elevation showing a plurality of the FIG. 1 devices mounted in a common housing.

One or more of the flow control valves 10 may be employed within the split housing 26, as shown in FIG. 2. A barrier wall 27 within the interior of the housing 26 is provided with a plurality of openings within circular seats 28 for reception of cooperating shoulders 29 provided on the shells 11. Fasteners 30 and washers 31 engage the shoulders 29 to prevent displacement of the shells 11 from the barrier wall 27. Each cup 17 is provided with apertures or ports described in detail below, so that fluid may flow from the inlet pipe 31 into the chamber 32 within the housing and then through the ports in the cup 17, through the interior of the shells 11, into the housing space 33 and out through the discharge pipe 34. Pressure in the housing chamber 32 causes each cup 17 to slide axially into its respective shell 11 against the action of its spring 22. This general plan of operation is set forth in said prior U.S. Pat. Nos. 3,131,716 and 3,256,905.

In accordance with the present invention, the ports in the cylindrical wall 18 of the movable cup 17 do not comprise single symmetrical tapered slots which extend axially for the full range of movement (as in prior U.S. Pat. Nos. 3,131,716 and 3,256,905), but instead the cup side wall 18 is provided with several axially extending series of circumferentially staggered separate port segments 41, 42, 43 and 44. This group of port segments 41, 42, 43 and 44 constitutes one series. The several series may or may not be duplicates. The cup 17 may have one such series or a plurality of such series depending on the desired flow capacity; six duplicate series are shown in the drawings.

The shape of the individual port segments and their relative position are chosen so that the rate of flow of fluid through the port segments remains substantially constant for any axial position of the movable cup 17 with respect to the circular opening 15 in the stationary shell 11. The pressure in the housing inlet chamber 32 acts on the end wall 19 of each movable cup against the action of the spring 22. The parts are in the position shown in FIG. 1 only when a very low pressure differential exists between the housing inlet chamber 32 and the discharge chamber 33. For greater pressure differentials, the cup 17 slides back through the opening 15 into the interior of the shell 11, thereby cutting off some of the combined area of port segments exposed to pressure in the chamber 32. As the differential pressure increases, the spring is further compressed so that less and less combined port area is available to handle the volume of fluid flow. Thus the port segments 41, 42, 43 and 44 in any one series are shaped so that their combined total area exposed to pressure in the chamber 32 varies in an inverse manner with respect to the force of the spring for any position of the cup relative to the stationary member. This "inverse manner" is not a straight-line function; for constant flow, the port area must change in inverse proportion to the square root of the pressure differential. As set forth in U.S. Pat. No. 3,131,716, the mathematical expression of the formula is:

$$A = k/\sqrt{X} \text{ or more precisely expressed } A = Q/kC\sqrt{X}$$

where $A$ is the total effective area, $X$ is the pressure differential, $K$ is a constant, $Q$ is a relatively constant flow rate, $k$ is a proportionality constant, and $C$ is the overall discharge coefficient of the flow passages.

Figure 3:
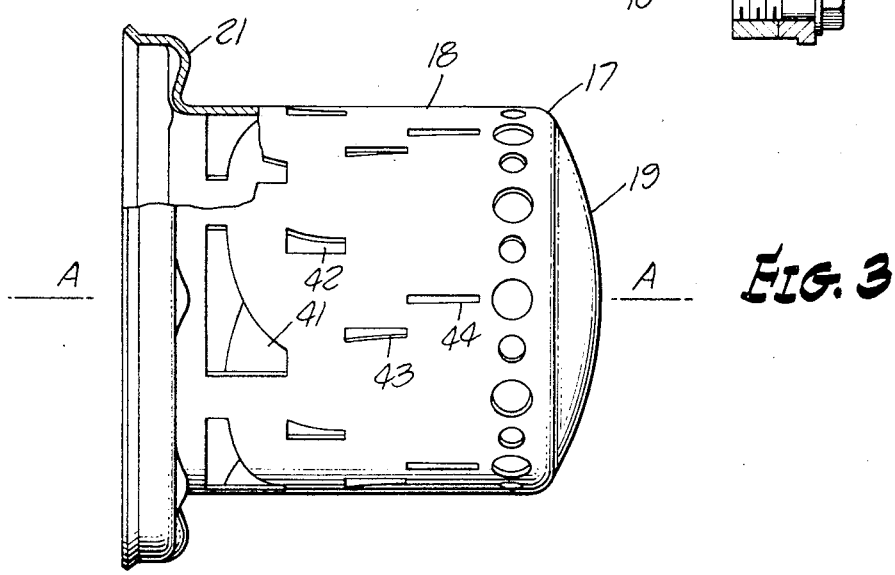
FIG. 3 is a side elevation partly broken away, showing a portion of the device of FIG. 1 on an enlarged scale.
Figure 4:
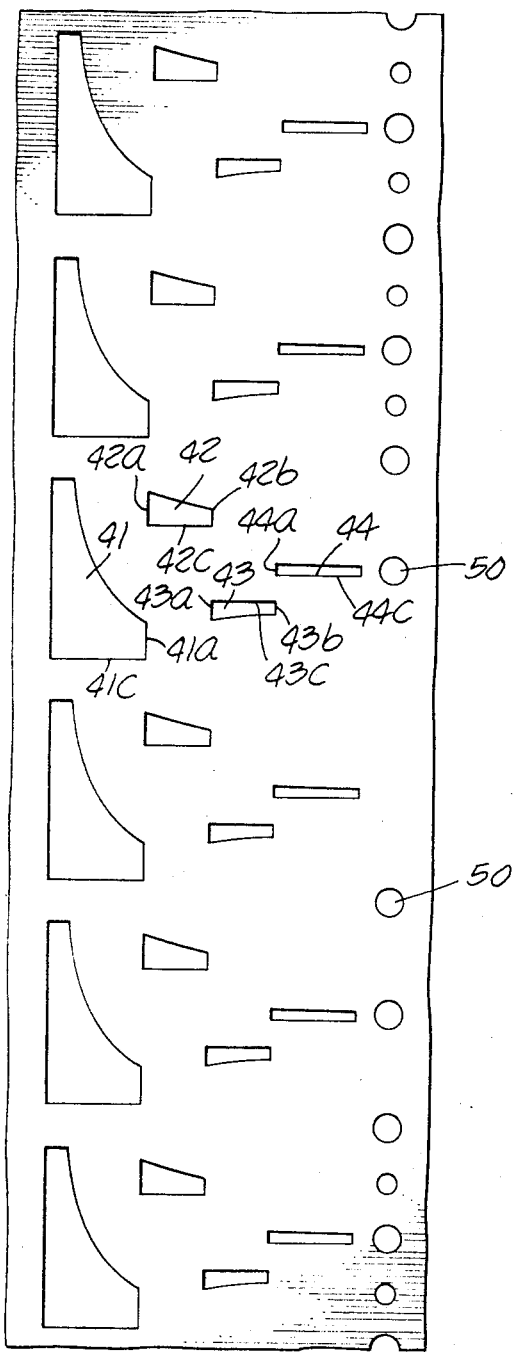
FIG. 4 is a diagrammatic developed view of the cylindrical portion of the cup shown in FIG. 3 and illustrating six separate duplicate series of port segments.

It will be noted that the port segments 41, 42, 43 and 44 decrease in circumferential width toward the end wall 19 of the cup 17. Also, adjacent port segments 41 and 42 have end boundaries 41a and 42a positioned in substantially the same transverse plane normal to the cup axis A—A (FIG. 3). Similarly, adjacent port segments 42 and 43 have end boundaries 42b and 43a which are in substantially the same transverse plane. Also, adjacent port segments 43 and 44 have end boundaries 43b and 44a which are in substantially the same transverse plane. A very narrow "gap" or "overlap" may be tolerated, but essentially the end boundaries are in the same transverse plane, as stated.

The series of port segments provide interlaced metal sections which retain more of the cylindrical structure by minimizing or dispersing the interruption of the circumferential surface of the cylindrical portion 18 of the cup. This also provides greater strength in the cylindrical wall 18 and reduces the tendency of internal stresses to distort the cylindrical configuration after the port openings have been cut out. It has been found that it eliminates the need for reforming the cylindrical portion 18 after the port segments are cut. Where the cylindrical portions 18 of the cup 17 are to be precision finished, as in a centerless grinder, the segmented port interlaced metal pattern provides a more continuous circumferential surface condition and consequently the ground surfaces are more uniformly cylindrical. Furthermore, there is a significant functional advantage of the segmented ports as compared to continuous tapering ports shown in said prior patents, in that foreign matter which may tend to enter a port segment is confined to the squared off limits of that port segment, rather than being wedged into a further narrowing section of a single continous port. This means that foreign objects are much more apt to pass through the segmented ports or to be cut off, rather than wedged or trapped therein.

It has been found highly desirable from a manufacturing and fabrication standpoint to design the port segments so that one axially extending side is straight and lies in a plane containing the axis A—A of the cup 17. Accordingly, it will be observed that the side boundaries 41c, 42c, 43c and 44c are each straight and each lies in a plane containing the axis of the cup. The opposite side boundary of each port segment is curved to meet the requirements of the formula as expressed above.

The series of round holes 50 provided in the cylindrical surface 18 near the end wall 19 may vary in number and size. These bypass holes 50 comprise a major part of the total minimum area, the balance being the area of the clearance between the cup and the opening 15.

Tests have shown that for any given axial position of the cup 17 relative to the opening 15, the same flow rate is achieved for the same total exposed port area whether a few large ports or many small port segments are employed. The explanation appears to be that the increased flow friction due to edge effect of the many port segment openings is offset by an improvement in equal distribution of pressure differential across the full opening of each port segment.

Figure 5:
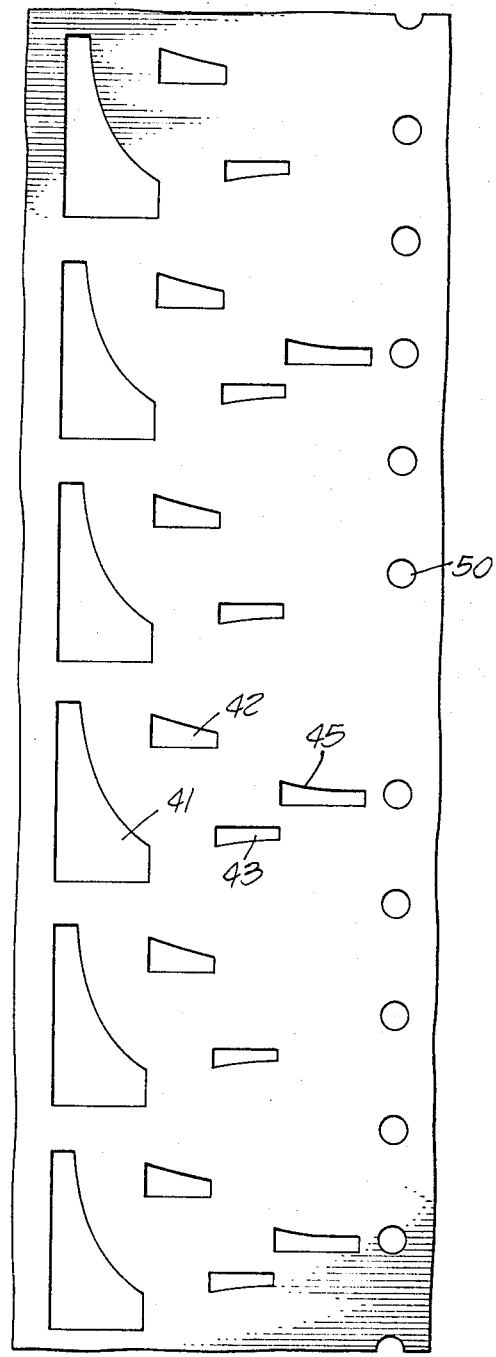
FIG. 5 is a view similar to FIG. 4 showing a modification.

In the modified form of the invention shown in FIG. 5, the long thin port segments 44 for each series of port segments are not employed. Instead, each alternate series is provided with one wider port 45 which produces the same flow characteristics as two separate thin ports 44. The thin ports 44 inherently narrow down to a minimum required width, and there is a practical limit to the minimum width that can be provided. The various series need not be duplicates, and the combined segmented ports in a series may supplement more than one series or part thereof. Moreover, any of the port segments, except the largest ones, may be combined in this manner.

By segmenting these ports and combining the area change requirements of two or more ports into a single port segment, lower minimum port area change requirements can be met within the practical minimum port width limitations. While, for the above reasons, it is desirable to consolidate one or more parts to cover the minimum width port requirements, it is not practical to consolidate ports to cover the maximum width port requirements. This is true because of limitations as to how much of the cylindrical cups' circumference should be cut by an individual port. Therefore, the segmented port concept makes it practical to consolidate ports to meet minimum width port requirements and retain individual port segments to cover the maximum port width area requirements.

Having fully described my invention, it is to be understood that I am not to be limited to the details herein set forth but that my invention is of the full scope of the appended claims.

I claim:

1. A flow control valve having, in combination: a stationary member provided with an opening, a ported element mounted to slide axially within said opening and having at least one axially extending series of laterally staggered separate port segments, the port segments in said series each continuously decreasing in lateral width from end to end toward one end of said element, adjacent port segments in the series having end boundaries in substantially the same transverse plane.

2. The flow control valve of claim 1 in which each port segment is non-symmetrical and has one straight side boundary defined from end to end by a plane containing the axis of movement of the ported element.

3. The flow control valve of claim 1 in which each series of separate port segments has a first segment, a second segment and a third segment, the large end of the second segment being identical in shape and width to the small end of the first segment, and the small end of the second segment being identical in shape and width to the large end of the third segment.

4. In a flow control valve having a stationary member provided with an opening, and having a cup mounted to slide axially within said opening, the improvement comprising: a side wall forming a portion of the cup, said side wall having at least one axially extending series of laterally staggered separate port segments, the port segments in said series each continuously decreasing in lateral width from end to end toward one end of the cup, adjacent port segments in the series having end boundaries in substantially the same transverse plane.

5. The flow control valve of claim 4 in which each port segment is non-symmetrical and has one straight side boundary defined from end to end by a plane containing the axis of movement of the ported element.

6. The flow control valve of claim 4 in which each series of separate port segments has a first segment, a second segment and a third segment, the large end of the second segment being identical in shape and width to the small end of the first segment, and the small end of the second segment being identical in shape and width to the large end of the third segment.

7. The flow control valve of claim 4 in which a plurality of series of separate port segments are provided, at least one of said series having an additional axially extending port segment of greater lateral width than the adjacent port segment in that series.

8. The flow control valve of claim 4 in which at least two duplicate series of separate port segments are provided, one only of said two series having an additional axially extending port segment of greater lateral width than the adjacent port segment in that series.

9. A flow control element for use in a flow control valve, comprising: a cup having a side wall and an end wall, said side wall of the cup having at least one axially extending series of laterally staggered separate port segments, the port segments in said series each continuously decreasing in width from end to end toward said end wall of the cup, and the adjacent port segments in the series having end boundaries in substantially the same transverse plane normal to the cup axis.

10. The flow control element of claim 9 in which a plurality of series of separate port segments are provided, at least one of said series having an additional axially extending port segment of greater circumferential width than the adjacent port segment in that series.

11. The flow control element of claim 9 in which at least two duplicate series of separate port segments are provided, one only of said two series having an additional axially extending port segment of greater circumferential width than the adjacent port segment in that series.

12. A flow control element for use in a flow control valve, comprising: a cup having a side wall and an end wall, said side wall of the cup having at least one axially extending series of laterally staggered separate port segments, the port segments in said series each continuously decreasing in width from end to end toward said end wall of the cup, the adjacent port segments in the series having end boundaries in substantially the same transverse plane normal to the cup axis, each port segment having one side boundary defined by a plane containing the cup axis.

13. A flow control element for use in a flow control valve, comprising: a cup having a cylindrical side wall and an end wall, said side wall of the cup having at least one axially extending series of circumferentially staggered separate port segments, the port segments in said series each continuously decreasing in circumferential width from end to end toward said end wall of the cup, the adjacent port segments in the series having end boundaries in substantially the same transverse plane normal to the cup axis.

14. In a flow control valve having a stationary member provided with a circular opening, and having a cup mounted to slide axially within said opening against the action of a spring, the improvement comprising: a cylindrical side wall forming a portion of the cup, said side wall having at least one axially extending series of circumferentially staggered separate port segments, the port segments in said series each continuously decreasing in circumferential width from end to end toward one end of the cup, adjacent port segments in the series having end boundaries in substantially the same transverse plane normal to the cup axis, and the port segments in the series being shaped so that their total exposed area on one side of the circular opening varies in an inverse manner with respect to the force of the spring for any position of the cup relative to the stationary member.

15. A flow control valve having, in combination: a stationary member provided with a circular opening, a valve element having a cylindrical wall slidable within said opening, said wall having a plurality of axially extending duplicate port segments each continuously decreasing in lateral width from a large end to a small end, the small ends of the duplicate port segments lying in the same transverse plane, said wall having at least one additional axially extending port segment decreasing continuously in lateral width from a wide end to a narrow end, each additional port segment having its wide end lying substantially in said transverse plane, but circumferentially staggered with respect to each of said duplicate port segments.

16. The flow control valve of claim 15 in which each of said duplicate port segments is non-symmetrical and has one straight side boundary defined from end to end by a plane containing the axis of movement of said valve element.

17. A flow control valve having, in combination: a stationary member provided with a circular opening, a valve element having a cylindrical wall slidable within said opening, said wall having a plurality of axially extending duplicate port segments each continuously decreasing in lateral width from a large end to a small end, the small ends of the duplicate port segments lying in the same transverse plane, said wall having a plurality of additional axially extending port segments each decreasing continuously in lateral width from a wide end to a narrow end, each additional port segment having its wide end lying substantially in said transverse plane, but circumferentially staggered with respect to each of said duplicate port segments, the total combined width of said wide ends of the additional port segments having the same transverse width as the total combined width of the small ends of said duplicate port segments.

18. The flow control valve of claim 17 in which each of said duplicate port segments is non-symmetrical and has one straight side boundary defined from end to end by a plane containing the axis of movement of said valve element.

* * * * *